United States Patent [19]

Guillaume et al.

[11] 4,437,418

[45] Mar. 20, 1984

[54] METHODS OF AND APPARATUS FOR TREATING WASTE PRODUCTS

[75] Inventors: Paul Guillaume, Ivry-sur-Seine; Pierre Karinthi, Grenoble, both of France

[73] Assignee: L'air Liquide, Societe Anonyme Pour L'etude et L'exploitation des Procedes Georges Claude, Paris, France

[21] Appl. No.: 323,251

[22] Filed: Nov. 20, 1981

[30] Foreign Application Priority Data

Dec. 5, 1980 [FR] France .................. 80 25901

[51] Int. Cl.³ ................................................ F23G 5/06
[52] U.S. Cl. ................................. 110/246; 110/234; 110/226; 432/116
[58] Field of Search ............... 110/210, 211, 226, 234, 110/246, 346, 254; 122/614, 11, 12, 138, 140 R, 190, 191, 195, 199–200, 235 R, 235 A, 235 D, 235 J, 294; 165/169, 171, 175; 202/100, 131, 136, 216, 218, 238; 432/115, 116, 103

[56] References Cited

U.S. PATENT DOCUMENTS

| | | |
|---|---|---|
| 2,999,796 | 9/1961 | Bromley ........................ 202/238 |
| 3,034,776 | 5/1962 | Hennenberger et al. ...... 432/116 X |
| 3,716,339 | 2/1973 | Shigaki et al. ................. 110/226 |
| 3,751,220 | 8/1973 | Rossi ............................. 432/116 X |
| 3,822,651 | 7/1974 | Harris et al. ................... 110/234 |
| 3,858,556 | 1/1975 | Terentiev ....................... 122/235 R X |
| 4,037,543 | 7/1977 | Angelo . |
| 4,052,151 | 10/1977 | Reichrt et al. ................ 110/246 X |
| 4,195,474 | 1/1980 | Bintz et al. .................... 165/169 X |
| 4,206,805 | 6/1980 | Beckett ......................... 165/169 X |
| 4,238,187 | 12/1980 | Euskirchen .................... 432/116 |
| 4,279,208 | 7/1981 | Guillaume et al. . |

FOREIGN PATENT DOCUMENTS

| | | |
|---|---|---|
| 1541353 | 2/1977 | United Kingdom . |
| 482712 | 9/1929 | Fed. Rep. of Germany ...... 202/218 |
| 1927556 | 12/1970 | Fed. Rep. of Germany . |
| 2534092 | 7/1975 | Fed. Rep. of Germany . |
| 740542 | 7/1932 | France . |
| 1396423 | 3/1965 | France .......................... 122/6 A |
| 2443645 | 12/1978 | France . |
| 633415 | 12/1949 | United Kingdom ............ 122/488 |
| 1349123 | 9/1972 | United Kingdom . |

*Primary Examiner*—Henry C. Yuen
*Attorney, Agent, or Firm*—Lee C. Robinson, Jr.

[57] ABSTRACT

This invention relates to methods of and apparatus for treating waste products. The apparatus comprises a furnace 1 and a recuperator 2, the furnace comprising at least one rotary section 4 for combustion and/or pyrolysis of the waste products and a stationary section 3 for guiding the smokes generated in the furnace between said rotary section 4 and the recuperator 2. This latter comprises an arrangement 11 –12 for causing the smokes to flow in a state of heat exchange with a fluid 14 for exploitation of the heat thus recovered. A heat-carrier fluid circuit is also incorporated between the walls delimiting the said stationary section 3 and/or the said rotary section 4 of the furnace and the recuperator 2, in such manner that the heat-carrier fluid may transfer the heat it had absorbed during its passage within the furnace walls to the exploitation fluid in the recuperator.

7 Claims, 4 Drawing Figures

4,437,418

METHODS OF AND APPARATUS FOR TREATING WASTE PRODUCTS

BACKGROUND OF THE INVENTION

The present invention relates to methods of and apparatus for treating waste products. It is more particularly applicable to the heat treatments imposed on industrial waste products for the purpose of energy recovery and includes causing the combustion and/or pyrolysis of the waste products within an incinerator furnace and recovering the heat generated within the furnace whilst establishing a heat exchange between the smokes emerging from the furnace and a fluid for the utilisation or exploitation of the heat thus recovered.

The specification of U.S. Pat. No. 4,279,208 discloses a method of and apparatus for processing waste products which essentially comprises an incinerator furnace and a recuperator or sensible heat receiver, situated along the path of the exhaust fumes issuing from the furnace. In apparatus of this kind, and as described in aforementioned patent specification, the furnace and the recuperator are set up in direct proximity to each other along the path of the fumes, the recuperator may in particular comprise a steam boiler, and the incinerator furnace is most frequently of the rotary kind, meaning that it comprises at least one rotary section in which the substantial proportion of the combustion (with pyrolysis if appropriate) takes place, and a stationary section which guides the fumes from the rotary section to their inflow into the recuperator. It is advantageously at the level of this stationary section that provision is made for elimination of the ashes, as well as for a post-combustion of the fumes in case of need or if for any reason found to be desirable.

In contradistinction to this known state of the art, it is essentially an object of the invention to increase the overall efficiency of energy conversion by improving the recovery of energy between the furnace and the recuperator, and also to improve the conditions of the combustion of the waste products carried out in the furnace and to reduce the cost of the apparatus for carrying out the method, all these advantages playing a part in the optimum salvaging of industrial waste products in the generation of power.

SUMMARY OF THE INVENTION

In the method of treating waste products hereinabove referred to, in accordance with which combustion and/or pyrolysis of the waste products is carried out within an incinerator furnace and the smokes or exhaust fumes generated at the outlet of this furnace are caused to flow into a recuperator in which they flow in a state of heat exchange with a fluid for exploitation of the heat thus recovered, the said furnace having at least one rotary section and a stationary section for guiding the fumes from the rotary section to the recuperator, in the present invention comprises the improvement wherein a flow of heat-carrier fluid is provided moreover between (a) the walls delimiting the said stationary section and/or the said rotary section of the furnace, where it absorbs the heat of the fumes present in this furnace, and (b) the recuperator in which it transfers this heat to the exploitation fluid.

In apparatus for treating waste products of the kind comprising an incinerator furnace having at least one rotary section for the combustion and/or pyrolysis of the waste products and a stationary section for guiding fumes generated in said furnace between the rotary section and a recuperator comprising means for causing the fumes to flow in a state of heat exchange with a fluid for exploitation of the heat thus recovered, the invention comprises the improvement wherein a circuit is provided for recovery of the heat of the furnace, said circuit assuring the flow of a heat-carrier fluid in the direction extending from said recuperator towards walls delimiting said stationary section and/or said rotary section of said furnace and in the direction extending from said walls towards said recuperator.

The apparatus may take various forms and may exist in a variety of particular embodiments.

Notwithstanding the practical embodiment of the heat-carrier fluid passages or ducts at the level of the furnace walls, the whole of the circuit or loop guiding the heat-carrier fluid from the recuperator to the furnace walls and back to the recuperator from these walls, may be constructed in such manner as to assure a natural heat flow therein, caused by the temperature variations undergone by the heat-carrier fluid. It may also be preferred, however, to provide a forced flow by means of a pump. On the other hand, the heat-carrier fluid may be formed by an optional fluid selected for its heat transfer properties, which is caused to flow in a loop within a closed circuit extending from the furnace walls to the exploitation fluid contained in the recuperator. In other embodiments, it may be the same fluid as the exploitation fluid flowing in the recuperator, and the heat-carrier fluid may then advantageously be drawn from the exploitation fluid contained in the recuperator, for example within the jacket of a steam boiler heated by circulation of the fumes, and be returned thereto after being heated in the walls of the furnace.

At the level of the furnace, it is commonly preferable to perform the complementary recovery of heat by means of the heat-carrier fluid at least within the walls of all the stationary elements of the furnace in contact with the fumes, on the one hand being the fixed section guiding the fumes from the furnace to the recuperator, but on the other hand also the stationary front of the furnace at which are installed in practice the burner and the waste products supply mechanism, at the other side from the recuperator. On these stationary elements, the ducts guiding the flow of the heat-carrier fluid may at least largely replace the refractory materials which commonly provide the heat insulation of the furnace, and they may advantageously be arranged in such manner that they actually form the casing enclosing the volume occupied by the fumes.

In another embodiment of the invention, the heat-carrier fluid is placed in circulation at least within the walls of the rotary section of the furnace. The embodiment is then particularly uncomplicated from the mechanical point of view if the heat-carrier fluid ducts remain stationary. They are then arranged to form a stationary external casing at the outside of a rotary internal casing which delimits the volume occupied by the smokes, but in direct proximity to this latter, in such manner as to allow of heat transfer. The ducts situated around the rotary section of the furnace may be connected to one and the same heat-carrier fluid circuit in parallel with other stationary ducts directly forming the casing for the smokes in the stationary sections of the furnace. Nevertheless, it may be preferable to organise the heat-carrier fluid circulation in such manner as to assure optimum possible heat recovery even at the level of the rotary section of the furnace and even at the expense of losing mechanical simplicity. With this end in view, the rotary internal casing delimiting the volume occupied by the smokes may be formed by the actual heat-carrier fluid ducts, arranged so that they are joined in practice and interconnected by appropriate sealing elements, and these ducts may be connected in parallel between a distributor and a collector positioned co-axially one within the other along the axis of the rotary section to assure the continuity of the circuit with the stationary elements in the recuperator.

The casings for the fumes formed by the heat-carrier fluid ducts may in all cases be faced internally or externally or both with insulating refractory linings and then need not be impervious to the fumes.

BRIEF DESCRIPTION OF THE DRAWINGS

In order that the invention may be more clearly understood, reference will now be made to the accompanying drawings which show certain embodiments thereof by way of example and in which.

DETAILED DESCRIPTION OF PREFERRED EMBODIMENTS

Figure 1:
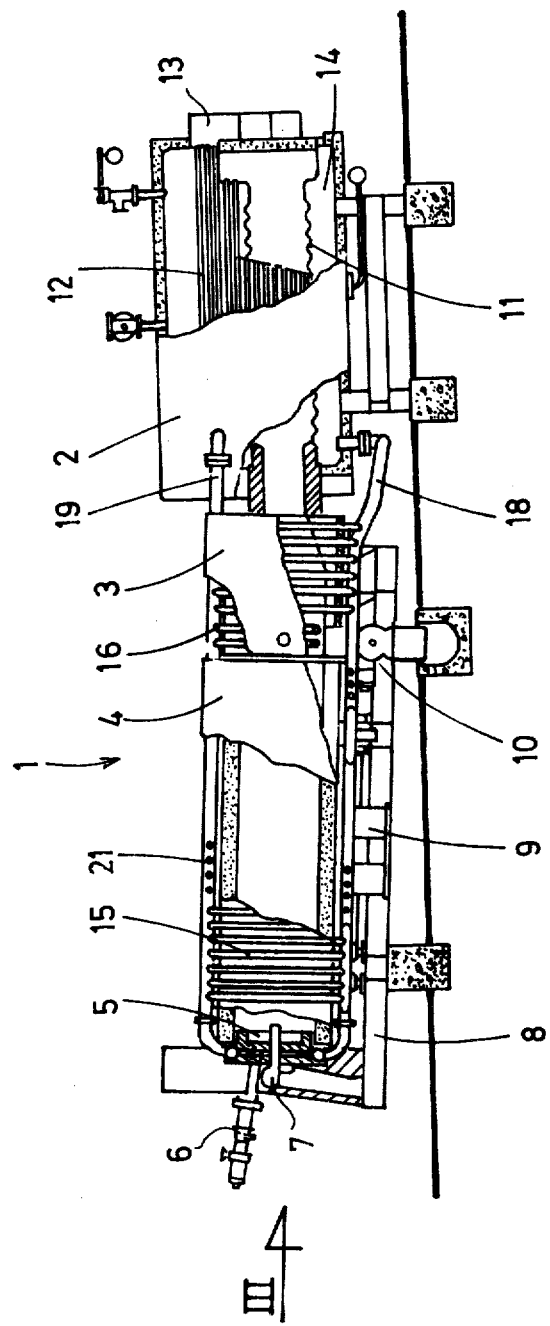
FIG. 1 diagrammatically illustrates a first embodiment of apparatus in accordance with the invention, in partial cross-section.

Referring now to the drawings, in accordance with the invention, the apparatus shown in FIG. 1 is intended for processing industrial waste products for the purpose of power generation by combustion and, if applicable pyrolysis of such waste products. It comprises an incinerator furnace 1 of the rotary kind, and as a recuperator a steam boiler 2 coupled directly to the outlet side of the furnace along the trajectory of the smokes, by means of a coupling device 3 which is considered as a stationary element forming part of the furnace.

The illustrations of the drawings diagrammatically reproduce the design of the furnace 1 and of the boiler 2. As for the furnace 1, FIG. 1 discloses a rotary section 4 opening downstream onto the coupling device 3 and closed off at the other extremity by a stationary frontal element 5. A feed mechanism 6 allows of infeed of the waste products to be burnt into the furnace via the frontal element 5. This latter is equally traversed by a burner 7 supplied with air and oxygen. A motor 9 allows the rotary section 4 to be driven in rotation around its axis via friction rollers. A structure 8 supports the whole of the furnace in position sloping with respect to the floor, so that the ashes remaining after combustion of the waste products flow progressively in the direction of the stationary section of the furnace where an extraction flap 10 is incorporated for these ashes. As for the boiler 2, the drawing shows the duct 11 having a corrugated wall which within the boiler extends the furnace smoke outlet, and the nests of tubes 12 in which the fumes then flow before being drawn off via the outlet 13. In this boiler, the sensible heat of the fumes is recovered to heat and vapourise the water 14. The steam generated, or the water-steam mixture, may be considered as an exploitation fluid which enables the energy thus recovered to be conveyed to the outside of the plant and thence to the point of consumption.

Figure 2:
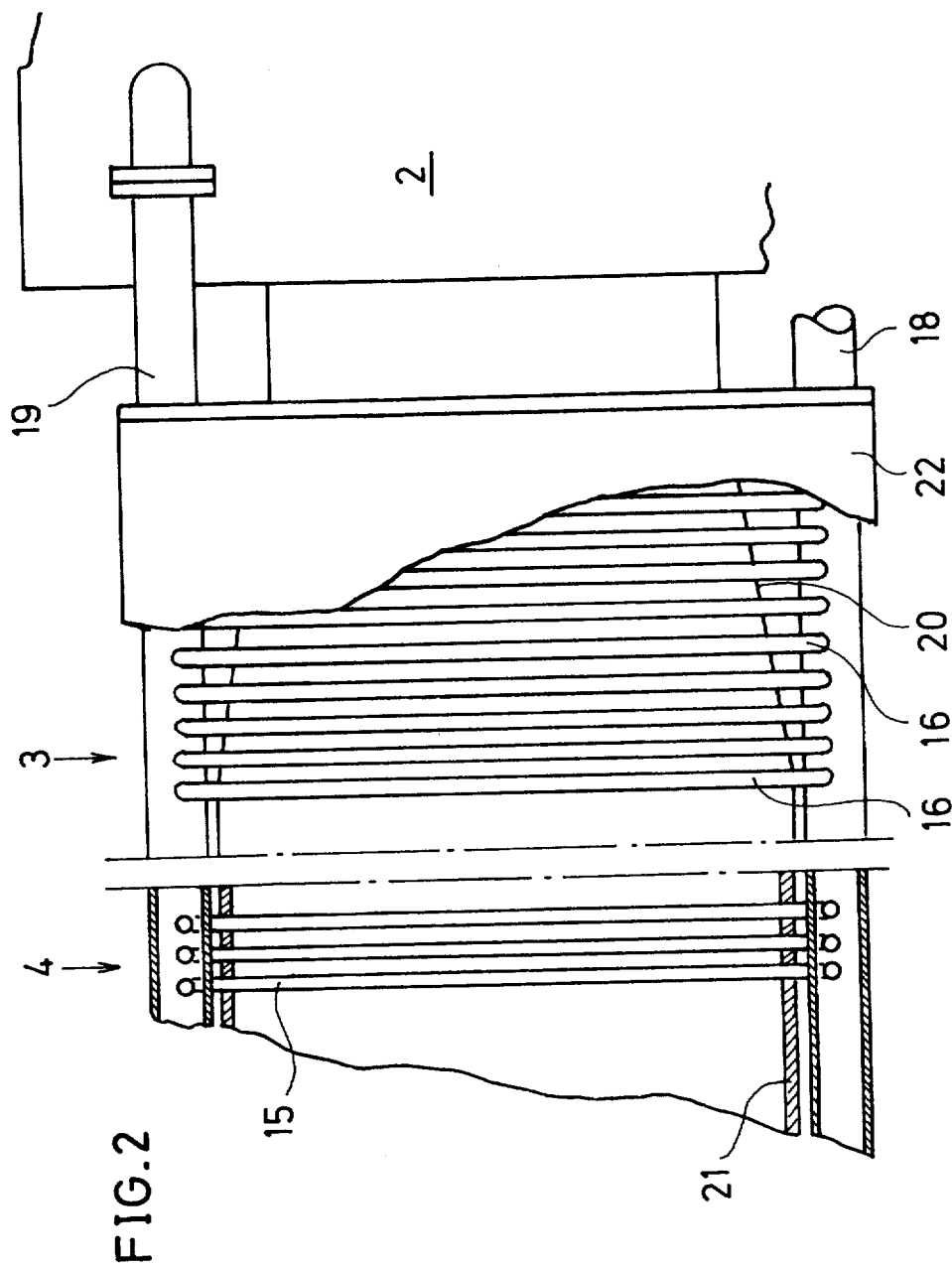
FIG. 2 illustrates a detail of this apparatus, at the level of the stationary section of the waste products incinerator furnace.
Figure 3:
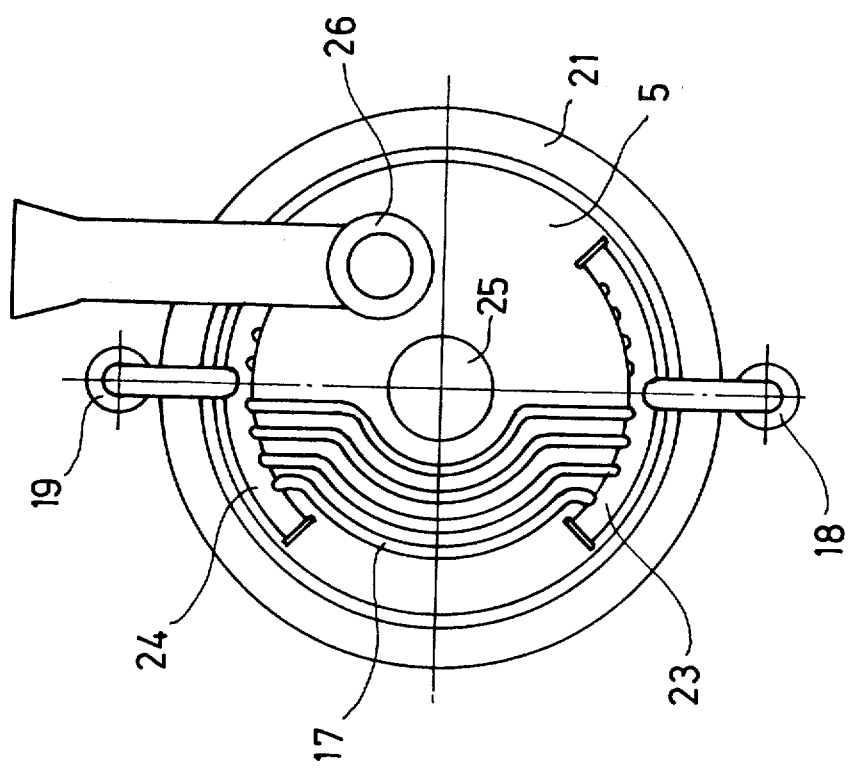
FIG. 3 illustrates the front of the furnace in a view corresponding to the arrow III of FIG. 1.

In accordance with an illustrative embodiment of the invention, provision is made to draw a part of the water-steam mixture into a complementary heat recovery circuit comprising ducts which are integrated into the walls of the furnace 1 for direct absorption at this level of a part of the heat of the fumes generated within the furnace. Ducts of this kind have been shown at 15 (FIG. 1) around the rotary section 4 of the furnace, at 16 (FIGS. 1 and 2) around the stationary coupling device 3, and at 17 (FIG. 3) against the frontal element 5. All these ducts are formed by tubes which are connected in parallel to common collectors or headers which, more particularly, comprise a feed distributor 18, opening into the mass of water 14 within the boiler 2, and a collector 19 which leads into the high part of the boiler. The water or the water-steam mixture having the same pressure as that prevailing in the boiler, passes through the recovery circuit in a natural thermal flow. The distributor 18 extends along the furnace 1 along its bottom generatrix, being divided to avoid the ash extraction system 10 and the rollers of the driving system of the rotary section 4. The collector 19 extends along the furnace in the same manner, but at its upper extremity.

Around the rotary section 4 of the furnace, the tubes 15 are placed side by side between the distributor 18 and the collector 19, in semi-circles situated at either side of the furnace. They are positioned as close as possible to the rotary cylinder 21 which forms the internal casing impervious to the fumes. In FIG. 1, this cylinder has been shown covered with a thickness of insulating refractory material.

By contrast, the tubes 16 are in direct contact with the smokes, being situated around the stationary device 3 at the junction between the rotary section and the boiler. To this end, the tubes are in practically contiguous pattern and they are interconnected externally by welded sheet metal elements 20. These elements and the tubes match the appropriate shape for the smoke duct diminishing in cross-section from the outlet of the rotary section 4 to the inlet of the boiler. A thickness of refractory insulating material may however be situated within the duct impervious to the smokes. An outer covering 22 which may be thermally insulated to limit heat losses has been installed on the outside of the casing formed essentially by the tubes 16.

The frontal element 5 also being a stationary section of the furnace, the casing impervious to the fumes is formed thereat in the same manner by the actual tubes 17 (FIG. 3) the walls of which are interconnected by welded sheet metal elements. The tubes 17 are connected in parallel to two collectors 23 and 24 of arcuate form, into which open the distributor 18 and collector 19, respectively. These tubes are shaped in such manner as to avoid the openings 25 and 26 made through the frontal element to allow of traversal by the burner and by the waste products infeed device, respectively. The sheet metal elements welded between the tubes complete the enclosure against the smokes throughout the circle of the front 5 which has been shown within the extremity of the rotary cylinder 21 in FIG. 3.

Figure 4:
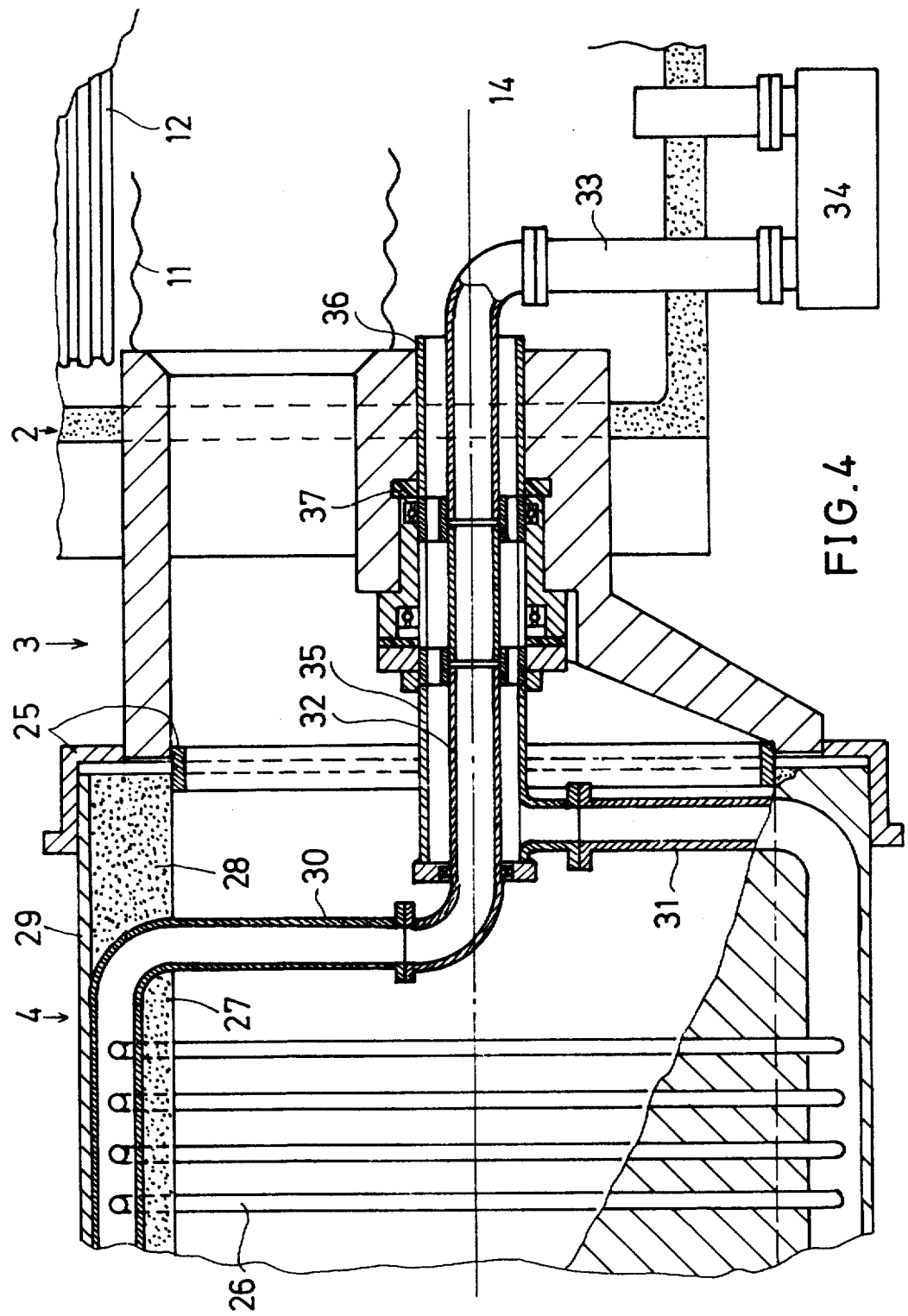
FIG. 4 illustrates another embodiment of apparatus in accorance with the invention, of which it shows a part only, in a partial cross-section.

By contrast to FIGS. 1 to 3, FIG. 4 partially illustrates apparatus in which the part of the heat recovery circuits which is situated at the level of the rotary section 4 of the furnace is devised in such manner that it is equally movable with this rotary section. This movable circuit may be combined with stationary circuits constructed as hereinabove referred to, but these latter have not been shown to avoid complicating FIG. 4. Furthermore, FIG. 4 is no more than a partial illustration of the boiler 2 with its smoke duct 11 and its tubular nests 12, as well as the rotary section 4 of the furnace the downflow outlet of which is connected to the intake of the duct 11 via the stationary coupling device 3. A connection system impervious to the smokes has been illustrated diagrammatically at 25 between the rotary section and the stationary section.

The stationary element 3 is traversed by two sets of co-axial ducts providing the connections between the boiler 2 and the rotary section 4 of the furnace along the circuit of the water drawn from the boiler to assure heat recuperation within the walls of the rotary section of the furnace. In this case, the tubes 26 which form the ducts around the internal volume of the furnace occupied by the fumes are interconnected by welded sheet metal elements, in such manner that they actually form the internal casing 27 impervious to the fumes in accordance with the description given above in respect of the stationary elements. Nevertheless, FIG. 4 shows a heat insulation 28 around this casing 27, and an outer casing 29, which complete the rotary section 4.

The tubes are connected between collectors 30 and 31 which are bent over at the downflow extremity of the rotary section and led back into the axis thereof. The distribution manifold 30 is extended by an axial duct 32 which establishes the connection to the stationary section of the collector 33 unitary with the boiler 2. A pump 34 assures withdrawal of water from the mass 14, as well as a forced flow through the recovery circuit. As for the collector 31, it leads into an annular passage formed around the duct 32 by means of a co-axial duct 35. The latter, which is unitary with the rotary assembly, is extended by a stationary duct 36 which leads into the boiler 2 around the internal duct of the distribution collector. At the level of the rotary joints, sealed systems such as 37 are incorporated to assure sealing against the fumes upon passing through the stationary device 3 on the one hand, and sealing against the watersteam mixture at the outlet of the duct 36 on the other hand.

The details of the embodiments which have been described have been given only by way of example and are in no way restrictive in respect of the invention. Different modified embodiments may be obtained by combining the different parts described and the different possibilities referred to, depending on the technical advantages which are of more particular interest. These advantages are of three kinds in the main, depending on whether they relate to the thermal operating conditions, the recovery of energy or the technological embodiment.

From the thermal point of view, the whole of the wall surfaces cooled by circulation of the heat-carrier fluid acts as a set of heat absorption areas with respect to the inside of the furnace. The magnitude of this absorption may be controlled as a matter of fact, by covering the internal surfaces of these elements with refractory materials of appropriate thickness and quality. By these means and by combination of the different embodiments in accordance with the invention, it is consequently possible to adjust the heat gradient within the furnace enclosure to secure the desirable graph. This degree of additional freedom as compared to plants of conventional design allows of very much greater mastery over the combustion conditions within the furnace, in particular. Furthermore, for an identical geometry of enclosure, the thermal loading and thus the quantity of product which may be processed, for example in the case of incineration, may be increased substantially.

The recovery of energy by means of the heat-carrier fluid circuit may be performed in very complete manner on all furnace walls, so that the heat losses through these walls are then practically eliminated. In these circumstances, the true efficiency of conversion of the furnace and recuperator set, meaning the energy obtained at the outlet of the recuperator, as compared to the potential energy fed into the furnace, may be analogous to that obtained, for example, with an industrial boiler operating with a conventional fuel rather than with waste products.

Finally, the technological advantages are of manifold kinds. Amongst the most substantial may be noted the elimination within the furnace enclosure of a great proportion of the refractory linings the service life of which is very limited as a rule, and their replacement by a cooled structure whose service life is almost unlimited on the contrary. On the other hand, any need to cool the furnace ancillaries, in particular the burner and the waste products supply mechanism is eliminated, and these operate in conditions in which the thermal stesses are low.

What we claim is:

1. In apparatus for treating waste products of the type comprising an incinerator furnace including at least one rotary section having a peripheral wall for the combustion and/or pyrolysis of the waste products and a stationary section between said rotary section and a recuperator and having a peripheral wall for guiding exhaust fumes generated in said furnace from the rotary section; said recuperator including means for causing the exhaust fumes to flow in a state of heat exchange with a heat-carrier fluid for exploitation of the heat thus recovered; the improvement which comprises a circuit for recovery of the heat of the furnace, said circuit conducting a flow of heat-carrier fluid in the direction extending from said recuperator toward the peripheral wall of one or both of said stationary section and said rotary section of said furnace and in the direction returning from said peripheral wall toward said recuperator to preheat the fluid in said recuperator, wherein said circuit comprises juxtaposed tubes connected in parallel between a distributor duct and a collector duct, which ducts are arranged opposite and parallel to one another longitudinally with respect to said furnace, wherein said tubes, with sheet metal elements welded therebetween, form a casing delimiting the volume occupied by the fumes within said furnace, and wherein some of said tubes at least partially form a stationary front closing off said furnace at an extremity thereof remote from said recuperator.

2. Apparatus according to claim 1, wherein said peripheral wall of the rotary section is formed of refractory material defining a chamber for the combustion; and said tubes are arranged as a network of ducts disposed over the peripheral wall of said rotary section with the thickness of said refractory material and the flow of said heat-carrier fluid through said network of ducts each being chosen to achieve a desired heat gradient within said incinerator furnace.

3. Apparatus according to claim 1, wherein said circuit is directly coupled to means for the circulation of the heat-carrier fluid in the recuperator.

4. Apparatus according to claim 1, wherein said recuperator comprises a steam boiler containing as said heat-carrier fluid a mass of water, and said circuit includes means for drawing the heat-carrier fluid from the mass of water of the steam boiler and returning the fluid as heated liquid to the steam boiler.

5. Apparatus according to claim 1, wherein said circuit is at least partially movable with the rotary section of said furnace.

6. Apparatus according to claim 5, wherein two coaxial ducts are provided in the axis of the rotary section of said furnace for connection between movable part of said recuperation circuit and stationary elements of said recuperator.

7. Apparatus according to claim 2, wherein said network of ducts is non-rotationally disposed surrounding, but out of contact with said rotary section.

* * * * *